United States Patent

Torii et al.

[11] Patent Number: 5,267,483
[45] Date of Patent: Dec. 7, 1993

[54] HIGH-DENSITY INSTALLATION TYPE ROBOT

[75] Inventors: Nobutoshi Torii, Hachioji; Kazuhisa Otsuka; Kunio Ueda, both of Minamitsuru, all of Japan

[73] Assignee: Fanuc Ltd., Minamitsuru, Japan

[21] Appl. No.: 838,733

[22] PCT Filed: Jul. 18, 1991

[86] PCT No.: PCT/JP91/00974
§ 371 Date: Mar. 16, 1992
§ 102(e) Date: Mar. 16, 1992

[87] PCT Pub. No.: WO92/01537
PCT Pub. Date: Jun. 2, 1992

[30] Foreign Application Priority Data

Jul. 23, 1990 [JP] Japan ................ 2-193107

[51] Int. Cl.⁵ .................. G05G 11/00; B25J 9/00
[52] U.S. Cl. ................ 74/479 B; 74/479 BP; 901/15; 901/23
[58] Field of Search ........... 74/479; 901/7, 15, 17, 901/23, 16

[56] References Cited

U.S. PATENT DOCUMENTS

| | | | |
|---|---|---|---|
| 3,043,448 | 7/1962 | Melton | 901/15 X |
| 3,047,167 | 7/1962 | Rose | 901/15 X |
| 3,066,805 | 12/1962 | Sullivan | 901/15 X |
| 3,226,833 | 1/1966 | Lemelson | 901/15 X |
| 3,451,224 | 6/1969 | Colechia et al. | 901/15 X |
| 3,665,148 | 5/1972 | Yasenchak et al. | 901/23 X |
| 3,821,498 | 6/1974 | Schaefer, Jr. et al. | 901/17 X |
| 4,169,758 | 10/1979 | Blackstone et al. | 901/17 X |
| 4,502,830 | 3/1985 | Inaba et al. | 901/23 X |
| 4,848,592 | 7/1989 | Shemeta | 221/211 |

FOREIGN PATENT DOCUMENTS

| | | |
|---|---|---|
| 2301423 | 7/1974 | Fed. Rep. of Germany . |
| 8704440 | 7/1987 | Fed. Rep. of Germany . |
| 370168 | 8/1963 | Switzerland . |
| 8201154 | 4/1982 | World Int. Prop. O. ........ 901/17 |

OTHER PUBLICATIONS

Werkstatt und Betrieb, *Industrie-Roboter zum Punktsweissen* vol. 112, No. 8, 1979, Munchen DE, p. 510.

Primary Examiner—Allan D. Herrmann
Assistant Examiner—David W. Laub
Attorney, Agent, or Firm—Staas & Halsey

[57] ABSTRACT

A high-density installation type robot able to be installed side by side with another such robot, to work on an object at the same time is provided. A robot wrist assembly (30) is equipped with three rotary axes ($\alpha$ axis, $\beta$ axis, $\gamma$ axis), and a robot arm (26) having the robot wrist assembly (30) mounted on an end thereof is given a rotary axis ($\theta$ axis). Further, a bracket-shaped holder (24) holding the robot arm (26) is provided in such a manner that it can move vertically (V) and linearly (FR), whereby a large rectangular parallelepiped, three-dimensional operating area can be secured and a wasted operating area eliminated.

4 Claims, 5 Drawing Sheets

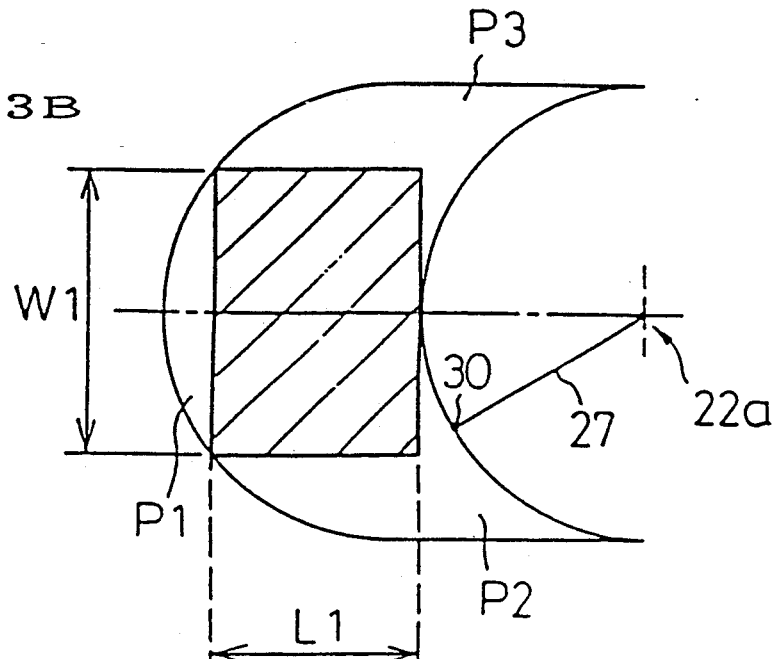
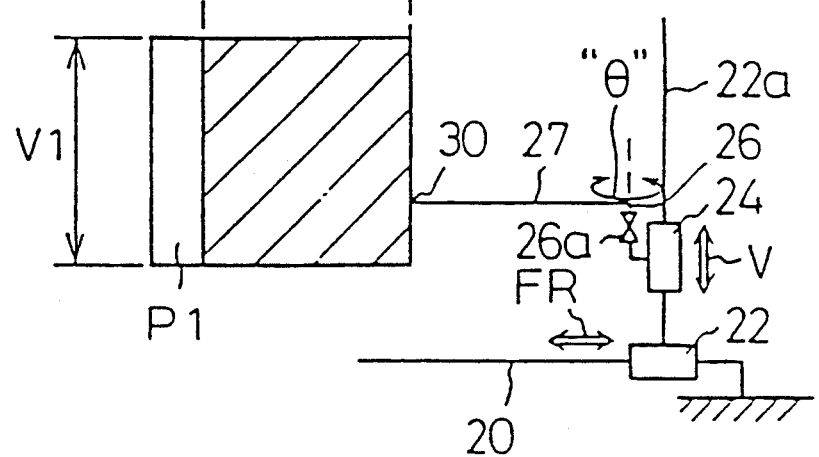

HIGH-DENSITY INSTALLATION TYPE ROBOT

BACKGROUND OF THE INVENTION

1. Field of the Invention

The present invention relates to the composition of a machine body of an industrial robot, and more particularly, to the composition of a movable machine body of a high-density installation type robot by which a plurality of robots are able to simultaneously work on an object without interfering with each other, to thereby achieve a desired robot operation with a high efficiency.

2. Description of the Related Art

In recent years, industrial robots have become increasingly used to promote the automation of operations in applications such as an automobile assembly line. In such an automated operation line or the like, a high-density installation method may be used whereby a plurality of industrial robots are installed side by side for working on an object, for example, an automobile, and a desired working area is allotted to each robot to thus ensure an efficient progress of the operation. More specifically, when spot-welding many points on an automotive body, the welding points are divided into a plurality of areas, and each of the robots is assigned one of those areas for spot-welding, to be able to thus spot-weld as many points as possible within a unit of time. The following describes a working area of the high-density installation type robot conventionally used for such a high-density installation type robot operation.

FIGS. 5A and 5B are schematic mechanism diagrams illustrating a mechanism and working area of the conventional high-density installation type robot, wherein FIG. 5A is a side view and FIG. 5B is a top plan view. As shown in FIG. 5A, the first robot arm 1 is provided so that it can turn around the axial center of a joint 2, the second robot arm 4 is provided to allow the second joint 2 of the first robot arm 1 to turn around the horizontal axial center of another joint 3, and a robot trunk 6 is provided which allows the second robot arm 4 to turn around the horizontal axial center at a joint 5. The bottom end of the robot trunk 6 is fixed to an installing surface, and a working end effector 7 attached to the end of the first robot arm 1 is positioned at a desired point in a three-dimensional space by the rotation of the two joints 3 and 5 around the horizontal axial center.

In the conventional high-density installation type robot, however, the end effector installed at the end thereof is moved from one point to another by the rotation of the joints 3 and 5 around the horizontal axial center, and therefore, the moving area in the space becomes a spherical area enclosed with a spherical enveloping surface. More specifically, the moving area of the end effector 7 is inside a three-dimensional space area which extends beyond the robot arms, as enclosed with circular arc solid lines A and B in the side view of FIG. 5A and the top plan view of FIG. 5B. Generally, however, many workpieces, e.g., automobile bodies, on which a high-density installation type robot works have a convex shape midway between a rectangular parallelepiped and a spherical contour, and there are a small number of workpieces having concave contours when observed from the outside space side. Therefore, the convex spherical operating area of the end effector of the robot mentioned above leads to a waste of the area in the robot's end effector operating area when working on such workpieces which have such a contour because there is no correspondence therebetween. More specifically, in the robot movable machine body design, the space extending beyond the robot's arms is also included in the operating area as described above, although only the hatched spaces shown in FIG. 5A and FIG. 5B provide the scope within which the robot can work on objects which are mostly concave. This poses a problem of a large waste of the area, and of a relatively limited operating area (the foregoing hatched area), which makes it impossible to secure a large practical operating area.

SUMMARY OF THE INVENTION

The present invention is intended to solve the above-mentioned problem, and an object of the present invention is to provide a high-density installation type robot capable of resolving the foregoing problem.

Another object of the present invention is to provide a high-density installation type robot having a movable machine body design which permits a minimized waste of an operating area and interfering area when a plurality of robots are closely installed side by side, each robot being assigned an even three-dimensional space operating area.

Still another object of the present invention is to provide a high-density installation type robot which, when two robots are symmetrically installed by mounting one on the ground and the other on a ceiling, makes it possible for both to secure a vertically even three-dimensional operating area.

To fulfill the aforementioned objects, a high-density installation type robot is provided, which can be installed side by side with another such robot, to simultaneously work on an object. The robot is equipped with an installing base and a robot movable machine body that permits a horizontal linear motion on the base, the robot movable machine body being equipped with a robot wrist rotatable around three, the first through third, independent axial centers, a robot arm that can be swiveled around the fourth vertical axial center, which is different from the first through third axial centers, a wrist transmission mechanism which connects the robot arm with the robot wrist and which is capable of independently transmitting the power of rotation around the first through third axial centers from the robot arm to the robot wrist, and a bracket means for holding the robot wrist, the robot arm, and the wrist transmission mechanism so that they can be linearly moved up and down in one piece.

A large rectangular parallelepiped, three-dimensional operating area is secured with a minimized waste of the operating area by providing the robot wrist with three rotary working axes, providing the robot arm having the robot wrist installed on the end thereof with a rotary axis, and providing a bracket type holding means for holding the robot arm so that it can move linearly in the directions of two axes which orthogonally intersect each other.

BRIEF DESCRIPTION OF THE DRAWINGS

FIG. 3A is a side view of a mechanism diagram illustrating a mechanism of a three-dimensional operating area of the high-density installation type robot in accordance with the present invention;

FIG. 3B is a top plan view of a mechanism diagram illustrating the mechanism of the three-dimensional operating area of the high-density installation type robot in accordance with the present invention;

DETAILED DESCRIPTION OF THE PREFERRED EMBODIMENTS

The present invention is now described in detail based on the embodiments shown in the accompanying drawings.

Figure 1:
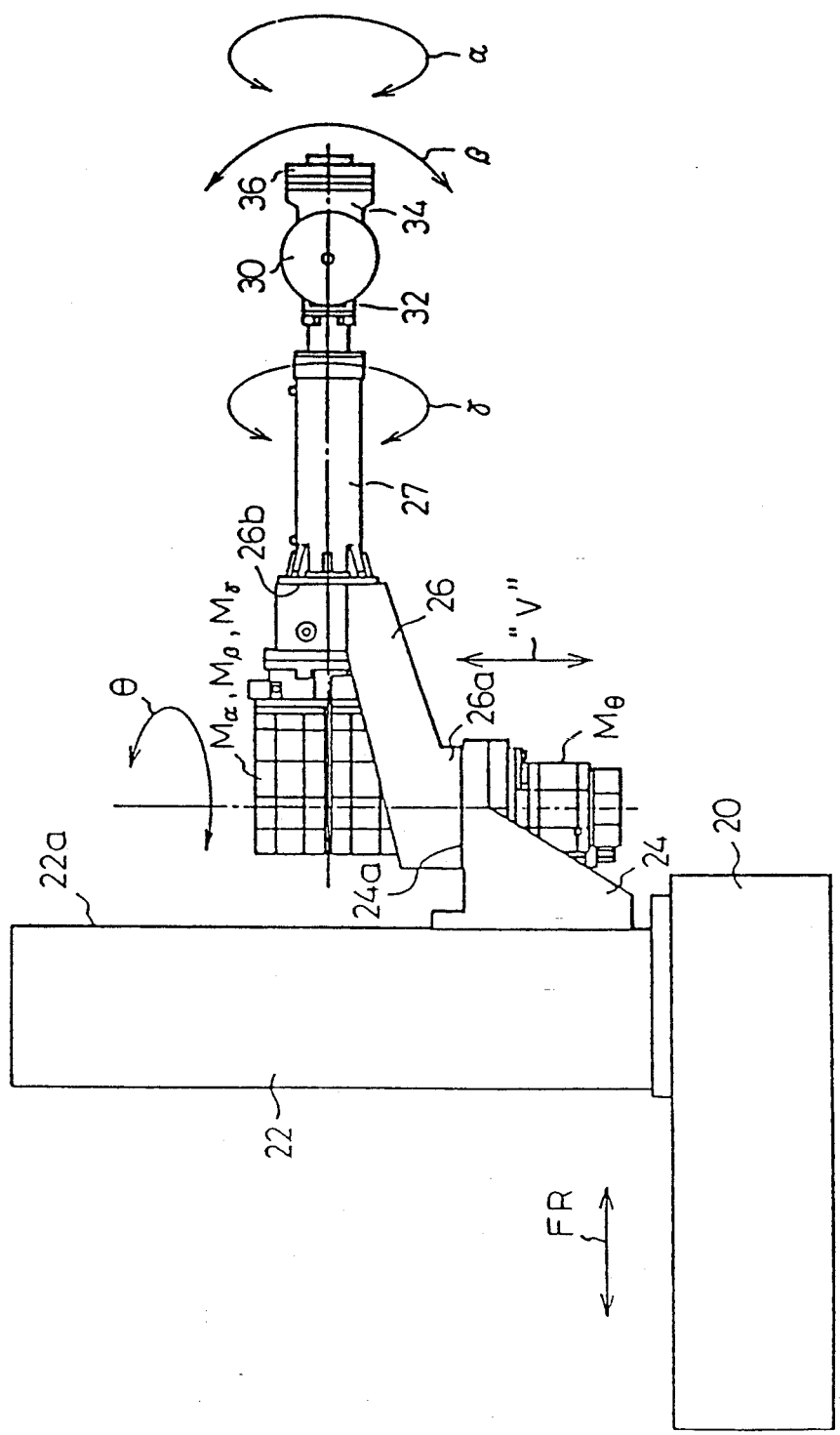
FIG. 1 is a side view illustrating the composition of a high-density installation type robot in accordance with the present invention.
Figure 2:
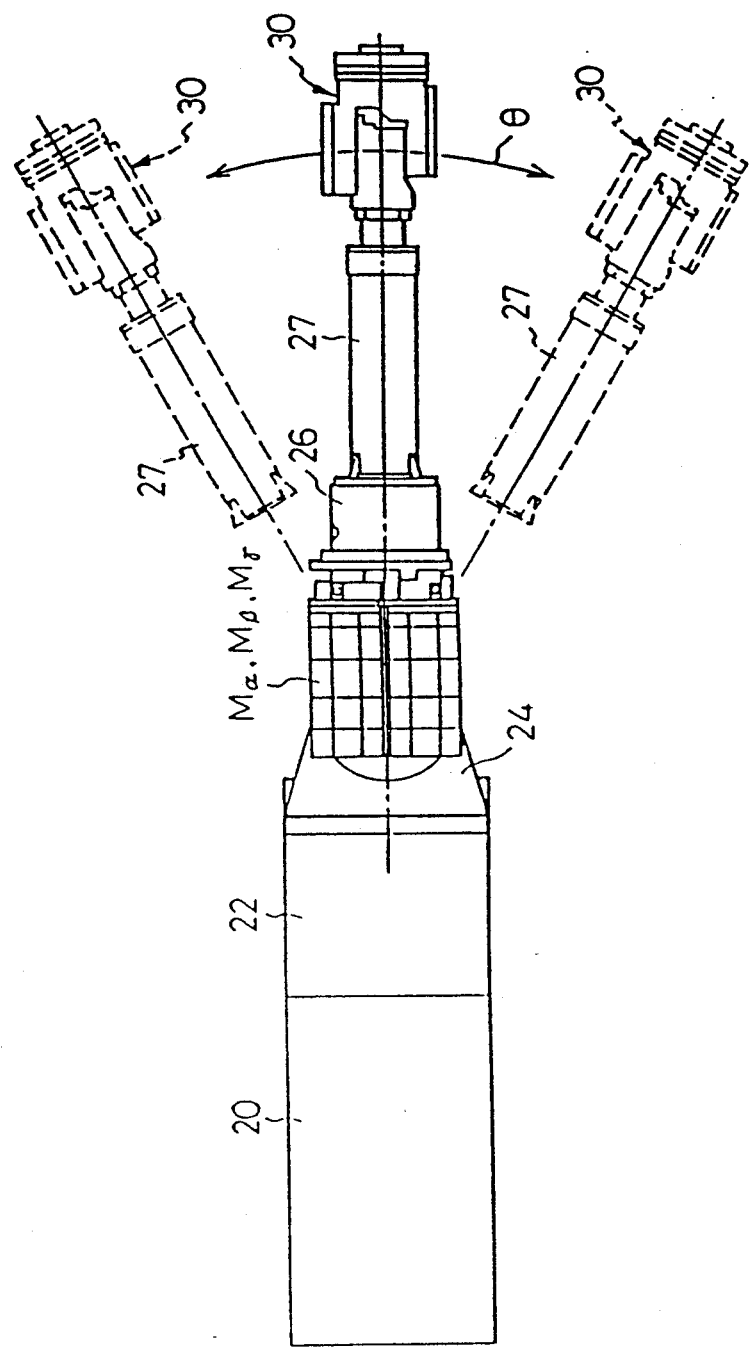
FIG. 2 is a top plan view of the high-density installation type robot in accordance with the present invention.

FIG. 1 and FIG. 2 are the side view and the top plan view, respectively, showing the composition of the high-density installation type robot in accordance with the present invention. The high-density installation type robot in accordance with the present invention has an installing base 20, and a column 22 mounted on the installing base 20 so that it can be moved linearly (longitudinally) in the direction of the horizontal straight line shown by an arrow FR. The column 22 has a guide surface 22a on the front, and a bracket-shaped holder 24 is provided along the guide surface 22a of the column 22 so that it can be moved up and down as shown by an arrow V. The holder 24 has a horizontal holding surface 24a extending forward, and on the horizontal holding surface 24a is mounted a bottom end 26a of a robot arm 26 in such a manner that it can rotate around a vertical axial center ($\theta$ axis). The robot arm 26 is driven by a drive motor $M\theta$, installed on the holder 24, to thus perform the foregoing rotary motion. Further, an end 26b of the robot arm 26 is provided to serve as a holding end for a wrist transmission mechanism 27, and on the back of the end 26b are mounted a plurality of wrist drive motors $M\alpha$, $M\beta$, $M\gamma$ or the like which constitute a wrist driving source.

The wrist rotation driving power generated by the aforementioned wrist drive motors $M\alpha$, $M\beta$, and $M\gamma$ is transmitted to a robot wrist assembly 30 provided on the end of the wrist transmission mechanism 27 via a rotary drive axis (not shown) of a coaxial three-axis design provided inside the wrist transmission mechanism 27. The robot wrist assembly 30 consists of the first joint 32, the second joint 34, and the third joint 36; the leading end of the third joint 36 constituting a mounting surface for mounting an end effector such as a robot hand. The first joint 32 is provided in such a manner that it is rotatable around the first axial center ($\gamma$ axis) by the rotary drive force transmitted from the wrist transmission mechanism 27, and the second joint 34 is provided in such a manner that it is rotatable around the second axial center ($\beta$ axis) which orthogonally intersects with the first rotary axial center with respect to the first joint 32. The wrist end 36 is rotatable around the third axial center ($\alpha$ axis) coaxial with the first rotary axial center with respect to the second joint 34. Namely, the robot wrist assembly 30, the robot arm 26, the transmission mechanism 27, the bracket-shaped holder 24 and the like constituting the robot movable machine body have six motion numbers of degrees of freedom consisting of four rotary axial centers and two linear motion axes with respect to the installing base 20.

The broken lines in FIG. 2 show the wrist transmission mechanism 27 and the robot wrist assembly 30 which are rotated together in the horizontal surface scope by the robot arm 26 rotatable around the axis $\theta$.

FIG. 3A and FIG. 3B are a side view and top plan view, respectively, of the mechanism diagram showing the operating area of the high-density installation type robot having the robot movable machine body consisting of the foregoing components. The robot in accordance with the present invention can move linearly up and down, as shown by the arrow V, along the guide surface 22a of the column 22, and move linearly in the longitudinal direction shown by the arrow FR on the installing base 20. Further, the joint 26a enables the robot arm 26 to turn in the horizontal surface scope around the axis $\theta$, and therefore, the end of the robot wrist assembly 30 can move to any point on a boundary surface of and inside the rectangular parallelepiped, three-dimensional operating area defined by the hatched area measuring V1 high, W1 wide and L1 deep, as is obvious from FIG. 3A and FIG. 3B. Furthermore, by securing such a rectangular parallelepiped operating area, the end of the robot wrist assembly 30 can reach any point on the surfaces of or inside workpieces having mostly a rectangular parallelepiped or spherical contour. Further, the robots can be closely installed side by side without the possibility of an interference of the robot arm 26, wrist transmission mechanism 27, and the robot wrist assembly 30 with those of the adjacent robots when moving in the hatched area, thus permitting a high-density installation.

Figure 5B:
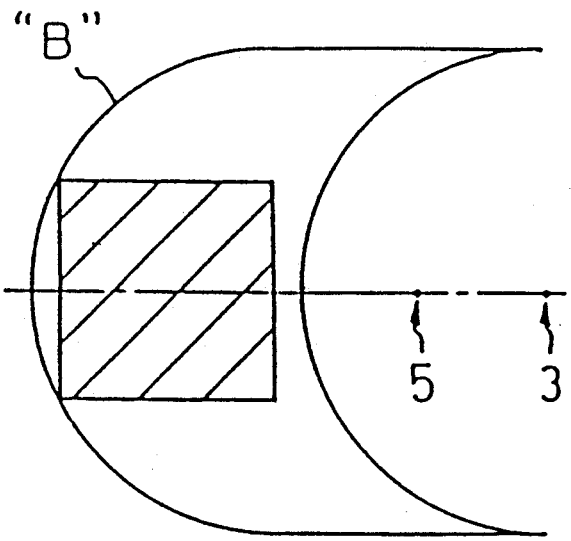
FIG. 5B is a top plan view of a schematic mechanism diagram illustrating the mechanism and operating area of the conventional high-density installation type robot.
Figure 5A:
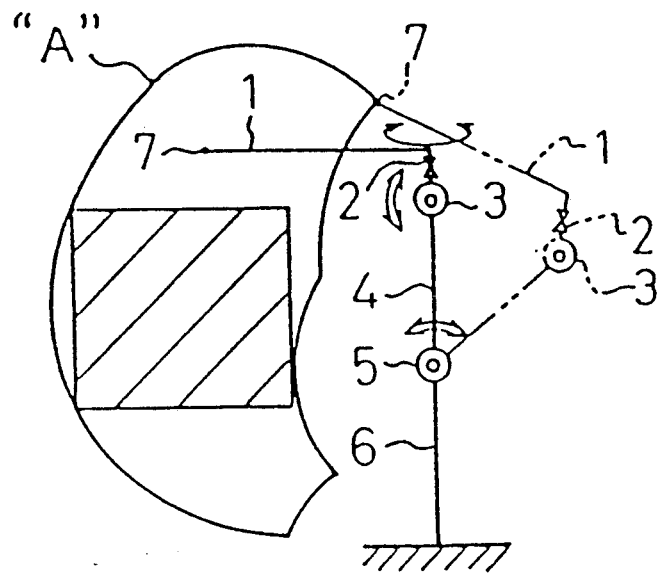
FIG. 5A is a side view of a schematic mechanism diagram illustrating the mechanism and operating area of a conventional high-density installation type-robot.

Namely, the wasted area (unshaded area) vertically included in the conventional operating area of FIG. 5A previously mentioned can be significantly reduced, and only the small unshaded areas at the front and sides shown by P1 through P3 become wasted operating areas. As a result, the robot's operating area for carrying out a desired operation on a workpiece amounts to an extremely high proportion of the total operating area of the robot. Further, in the foregoing front area P1, robots closely installed side by side do not interfere with each other even when carrying out a similar operation, and the area is also advantageous in that it can be effectively used for working on a workpiece having a concave.

Figure 4:
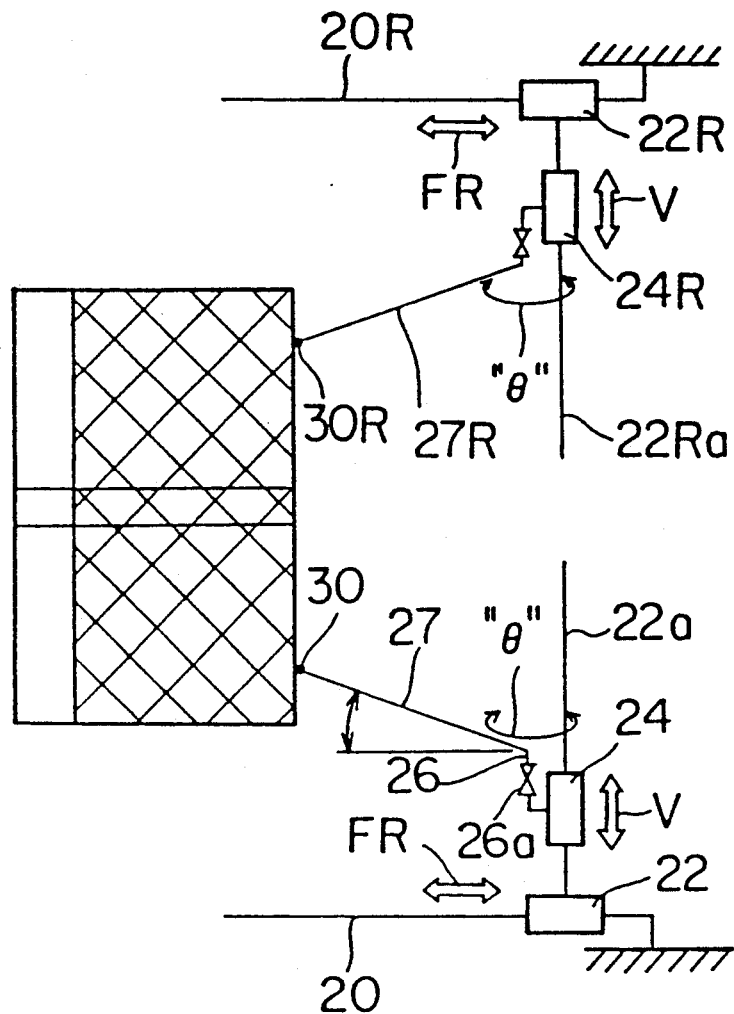
FIG. 4 is a mechanism diagram illustrating the installation composition and operating area of the high-density installation type robot according to another embodiment.

FIG. 4 shows the composition and operating area of the high-density installation type robot according to another embodiment of the present invention. This embodiment differs from the aforementioned embodiment in that the wrist transmission mechanism 27 extending from the robot arm 26 toward the robot wrist assembly 30 is slanted upward with respect to the horizontal axial center which orthogonally intersects the vertical axial center ($\theta$ axis) of the robot arm 26. This means that the robot wrist assembly 30 is positioned higher than the rotary joint 26a of the robot arm 26. According to such a composition, as shown in FIG. 4, when a robot is installed on the ground, while another robot of the same configuration is suspended from a ceiling, so that they are vertically symmetrical, both have a large vertical operating area and are capable of performing a robot operation without causing interference between the robot arms 26 and 26R or between the wrist transmission mechanisms 27 and 27R. The operating area wherein the shaded portions cross indicates the area that can be reached by both the upper and lower robot wrist assemblies 30 and 30R. Providing such an overlapping operating area eliminates a "dead zone" wherein neither the upper robot nor the lower robot can work. Furthermore, to prevent both robot wrist assemblies 30 and 30R from interfering with each other at a point within the overlapping operating area, the robot wrist assemblies 30 and 30R need only be controlled so that they do not reach the same point at the same time, thus permitting a relatively easy control.

As described above, it can be understood that, according to the present invention, it is possible to obtain a composition of a robot movable machine body providing a maximized three-dimensional operating area necessary for performing a desired operation on a workpiece in a total operating area of the movable machine body in a robot, and a minimum chance of interference even when a plurality of robots are closely installed side by side and actuated to perform an operation at the same time in a single operating area.

Thus, according to the high-density installation type robot of the present invention, a plurality of robots can be closely installed side by side, for working on a workpiece, the individual robots being able to simultaneously perform a desired job assigned thereto without interfering with each other, thereby permitting a significant reduction of the time required to complete all jobs necessary for a workpiece. Further, each robot has a minimized wasted area in the operating area wherein the robot performs a desired job on a workpiece, making it possible to keep energy loss in the robot operation to a minimum. Furthermore, the way in which the robots are installed is not limited to a lateral side-by-side layout; the installing density can be increased to further improve the operating efficiency on a workpiece by installing the robots in a vertically symmetrical manner.

We claim:

1. A high-density installation robot able to be installed side by side with another such robot for working on an object at the same time as the other such robot, comprising:
    an installation base having a portion which extends in a first direction;
    a robot machine body connected to the base and movable in the first direction, the robot machine body having bracket means extending in the first direction;
    a robot arm connected to and movable with the bracket means and having an arm joint turning about an axis;
    a robot wrist movable with the bracket means and having first, second and third wrist joints, the first and second wrist joints turning about respective axes which are perpendicular to one another, the third wrist joint turning about an axis which is coaxial with the first wrist joint axis, the first, second and third wrist joint axes being non-coaxial with the arm joint axis; power supply means, for supplying rotation power, supported by the machine body; and
    wrist transmission means for connecting the robot arm and robot wrist and for independently transmitting the rotation power from the power supply means to each of the first, second and third wrist joints, the wrist transmission means being movable with the bracket means, and the third wrist joint being connected remote from the robot arm relative to the first and second wrist joints.

2. The high-density installation robot according to claim 1 wherein the machine body has a column extending in the second direction and the bracket means is movable on the column.

3. The high-density installation robot according to claim 1 wherein the arm joint axis extends in the second direction, the first wrist joint is positioned closer to the arm than the second and third wrist joints, and the first wrist joint axis extends in a direction which is at an acute angle to the first direction.

4. The high-density installation robot according to claim 1 wherein the arm joint axis extends in the second direction, the first wrist joint is positioned closer to the arm than the second and third wrist joints, and the first wrist joint axis extends in the first direction.

* * * * *

UNITED STATES PATENT AND TRADEMARK OFFICE
CERTIFICATE OF CORRECTION

PATENT NO. : 5,267,483

DATED : December 7, 1993

INVENTOR(S) : Nobutoshi Torii, et al.

It is certified that error appears in the above-indentified patent and that said Letters Patent is hereby corrected as shown below:

Col. 4, line 52, after "cave" insert --contour--.

Col. 6, line 8, after "direction" insert --and movable in a second direction which is perpendicular to the first direction--.

Signed and Sealed this

Twelfth Day of July, 1994

Attest:

BRUCE LEHMAN

Attesting Officer

Commissioner of Patents and Trademarks